(12) United States Patent
Shin

(10) Patent No.: US 12,351,056 B2
(45) Date of Patent: Jul. 8, 2025

(54) EV USER AUTHORIZATION METHOD AND SYSTEM

(71) Applicants: Hyundai Motor Company, Seoul (KR); Kia Corporation, Seoul (KR); Myongji University Industry and Academia Cooperation Foundation, Gyeonggi-do (KR)

(72) Inventor: Min Ho Shin, Gyeonggi-do (KR)

(73) Assignees: Hyundai Motor Company, Seoul (KR); Kia Corporation, Seoul (KR); Myongji University Industry and Academia Cooperation Foundation, Gyeonggi-do (KR)

( * ) Notice: Subject to any disclaimer, the term of this patent is extended or adjusted under 35 U.S.C. 154(b) by 576 days.

(21) Appl. No.: 17/606,269

(22) PCT Filed: Apr. 24, 2020

(86) PCT No.: PCT/KR2020/005298
§ 371 (c)(1),
(2) Date: Oct. 25, 2021

(87) PCT Pub. No.: WO2020/218810
PCT Pub. Date: Oct. 29, 2020

(65) Prior Publication Data
US 2022/0212559 A1 Jul. 7, 2022

Related U.S. Application Data

(60) Provisional application No. 62/895,566, filed on Sep. 4, 2019, provisional application No. 62/844,977, filed
(Continued)

(30) Foreign Application Priority Data
Apr. 23, 2020 (KR) .................. 10-2020-0049178

(51) Int. Cl.
*B60L 53/60* (2019.01)
*B60L 53/16* (2019.01)
(Continued)

(52) U.S. Cl.
CPC ............... *B60L 53/60* (2019.02); *B60L 53/16* (2019.02); *G06Q 50/06* (2013.01); *H04L 9/0825* (2013.01); *H04L 9/321* (2013.01)

(58) Field of Classification Search
CPC .......... B60L 53/60; B60L 53/16; B60L 53/65; B60L 53/665; G06Q 50/06;
(Continued)

(56) References Cited

U.S. PATENT DOCUMENTS

2008/0228613 A1\* 9/2008 Alexander ............. G06Q 20/14
705/35
2009/0312903 A1\* 12/2009 Hafner ................... B60L 53/64
701/36

(Continued)

FOREIGN PATENT DOCUMENTS

JP   2010-213497 A   9/2010
JP   2011-164756 A   8/2011
(Continued)

OTHER PUBLICATIONS

International Search Report issued on Jul. 31, 2020 in corresponding PCT Application No. PCT/KR2020/005298.
(Continued)

*Primary Examiner* — Santosh R Poudel
(74) *Attorney, Agent, or Firm* — Fox Rothschild LLP

(57) ABSTRACT

Disclosed is an electric vehicle (EV) user authorization method for charging an EV, the method performed by a device for mediating EV user authorization, in association with a mobility operator (MO) who makes a contract with an EV user and provides a charging service to a corresponding
(Continued)

EV and a charge point operator (CPO) who supplies electric power to the EV which requests charging. The EV user authorization method may comprise the steps of: receiving association information between the EV and a charging service account from the mobility operator; storing the association information between the EV and the charging service account; receiving an association information identification request for an EV to be charged, from the charge point operator; and providing association information between the EV to be charged and the charging service account to the charge point operator.

18 Claims, 6 Drawing Sheets

Related U.S. Application Data on May 8, 2019, provisional application No. 62/837,919, filed on Apr. 24, 2019.

(51) Int. Cl.
*G06Q 50/06* (2012.01)
*H04L 9/08* (2006.01)
*H04L 9/32* (2006.01)

(58) Field of Classification Search
CPC ............... H04L 63/0823; H04L 9/3263; H04L 2209/80; H04L 2209/84; H04L 9/0825; H04L 9/321

See application file for complete search history.

(56) References Cited

U.S. PATENT DOCUMENTS

| 2011/0191265 | A1 | 8/2011 | Lowenthal et al. |
| 2015/0202974 | A1* | 7/2015 | Rub .......................... B60L 3/12 320/109 |
| 2018/0336551 | A1* | 11/2018 | Mouftah ............... H04L 9/3213 |

FOREIGN PATENT DOCUMENTS

| JP | 2015-049851 A | 3/2015 |
| KR | 10-2013-0047598 | 5/2013 |
| KR | 10-2014-0027497 | 3/2014 |
| KR | 10-2017-0073836 | 6/2017 |
| WO | 2015/068910 | 5/2015 |
| WO | WO-2016142191 A1 * | 9/2016 |

OTHER PUBLICATIONS

Road vehicles—Vehicle-to-Grip Communication Interface—Par 2: Network and application protocol requirements—International Standard—ISO 15118-2 (2014).

* cited by examiner

EV USER AUTHORIZATION METHOD AND SYSTEM

CROSS REFERENCE TO RELATED APPLICATION

This application is a national phase filed under 35 USC 371 of PCT International Application No. PCT/KR2020/005298 filed on Apr. 24, 2020, which claims under 35 U.S.C. § 119 (a) the benefit of Korean Patent Application No. 10-2020-0049178 filed on Apr. 24, 2019, which claims priority to U.S. Provisional Application No. 62/837,919, filed Apr. 24, 2019, U.S. Provisional Application No. 62/844,977, filed May 8, 2019, and U.S. Provisional Application No. 62/895,566, filed Sep. 4, 2019, the entire contents of which are incorporated by reference herein.

BACKGROUND

(a) Technical Field

The present disclosure relates to an electric vehicle (EV) user authorization method and system, more particularly, to the EV user authorization method for EV charging, the EV user authorization system, and an apparatus for intermediating an EV user authorization.

(b) Description of the Related Art

An electric vehicle (EV) is driven by an electric motor by power stored in a battery, and produces less pollution such as exhaust gas and noise compared with a conventional gasoline engine vehicle, fewer faults, a longer life span, and advantageously, operation of the EV is simplified.

Typically EVs are classified into hybrid electric vehicles (HEVs), plug-in hybrid electric vehicles (PHEVs), and electric vehicles (EVs), based on a driving source. The HEV has an engine as a main power source and a motor as an auxiliary power source. The PHEV has a main power motor and an engine used when a battery is discharged. The EV has a motor, but the EV does not have an engine.

An electric vehicle charging system may be defined as a system that charges a battery mounted in an electric vehicle using power obtained from a commercial power grid or stored in an energy storage device. Such an electric vehicle charging system may have various forms depending on a type of the electric vehicle. For example, the electric vehicle charging system may include a conductive charging system using a cable or a non-contact wireless power transfer system.

In this regard, an eMobility service is a business segment that provides a service of supplying electricity to an EV user who owns or drives the EV or an organization that owns and operates the EVs for their own business such as transportations, logistics, or rental services. A typical eMobility service provider executes a contract with the EV user including the organizations mentioned above and bills for the electricity based on the amount of the electricity used for the charging or the other billing criteria. From a business point of view, it is important to authenticate the EV user when the EV is charged because revenue of the eMobility service provider will be at risk if there is no adequate manner of authenticating the EV user. Further, the entire charging infrastructure and the power grid located behind the charging infrastructure are vulnerable to malicious attempts by an unauthorized group exploiting the security vulnerabilities for political or financial motive or for a sense of fulfillment.

SUMMARY

To solve the problems above, provided is an electric vehicle user authorization method for charging an electric vehicle.

Provided is an EV user authorization system for charging an electric vehicle.

Provided is an apparatus for intermediating an EV user-authorization.

According to an aspect of an exemplary embodiment, provided is an electric vehicle (EV) user authorization method for charging an EV performed by an EV user authorization intermediary device in association with a mobility operator (MO) having a contract with an EV user to provide a charging service to the EV and a charge point operator (CPO) supplying electric power to the EV. The EV user authorization method includes: receiving association information between the EV and a charging service account from the MO; storing the association information between the EV and the charging service account; receiving a request for an association information of an EV to be charged from the CPO; and providing the association information between the EV to be charged and the charging service account to the CPO.

The EV user authorization method may further include: receiving a notification of occurrence of a change in the charging service account from the MO; and updating the charging service account in which the change occurred.

The EV user authorization intermediary device may be a clearing house service (CHS) device certified by a vehicle-to-grid (V2G) root certification authority (CA).

The EV may request an authorization from the CPO using an EV certificate and a corresponding private key.

The EV certificate may be issued by an original equipment manufacturer (OEM) of the EV and include a unique identifier of the EV and the corresponding private key.

The association information between the EV and the charging service account may include at least one of an EV identifier, an eMobility account identifier (eMAID) for the charging service, or an expiration date.

According to another aspect of an exemplary embodiment, provided is an electric vehicle (EV) user authorization intermediary device for intermediating the EV user authorization for an charging the EV in association with a mobility operator (MO) having a contract with the EV user to provide a charging service to the EV and a charge point operator (CPO) supplying electric power to the EV. The EV user authorization apparatus includes: a processor; and a memory storing at least one instruction to be executed by the processor. When executed by the processor, the at least one instruction causes the processor to: receive association information between the EV and a charging service account from the MO; store the association information between the EV and the charging service account; receive a request for an association information of an EV to be charged from the CPO; and provide the association information between the EV to be charged and the charging service account to the CPO.

The at least one instruction further comprises instruction, when executed by the processor, may cause the processor to: receive a notification of occurrence of a change in the charging service account from the MO; and update the charging service account in which the change occurred.

The EV user authorization intermediary device may be a clearing house service (CHS) device certified by a vehicle-to-grid (V2G) root certification authority (CA).

The EV may request an authorization from the CPO using an EV certificate and a corresponding private key.

The EV certificate may be issued by an original equipment manufacturer (OEM) of the EV and include a unique identifier of the EV and the corresponding private key.

The association information between the EV and the charging service account may include at least one of an EV identifier, an eMobility account identifier (eMAID) for the charging service, or an expiration date.

According to yet another aspect of an exemplary embodiment, provided is an EV user authorization system for charging an EV. The EV user authorization system includes: a mobility operator (MO) public key infrastructure (PKI) server configured to associate the EV with a charging service account according to a request of an EV user to generate association information between the EV and the charging service account, and notify the associated information to a clearing house service device; a clearing house service (CHS) device configured to receive and store the association information between the EV and the charging service account from the MO and provide the association information between the EV and the charging service account in response to a request; and a charging station operator (CPO) configured to authenticate the EV requesting a charging by querying a charging service account information bound to an identifier of the EV requesting the charging to the CHS device.

The an EV user authorization system may further include: an original equipment manufacturer (OEM) PKI server configured to allocate a unique identifier to the EV and issue an EV certificate including the unique identifier and a corresponding private key to the EV.

The CHS device may be authenticated by a vehicle-to-grid (V2G) root certification authority (CA).

The EV may request an authorization from the CPO using an EV certificate and the corresponding private key.

The CHS device may receive a notification of occurrence of a change in the charging service account from the MO and updates the charging service account in which the change occurred.

The association information between the EV and the charging service account may include at least one of an EV identifier, an eMobility account identifier (eMAID) for the charging service, or an expiration date.

The present disclosure, which performs the EV user authorization by using an EV identifier, may prevent privacy violations and general data protection regulation (GDPR) violations. Also, the method of the present disclosure makes the MO PKI system unnecessary.

Furthermore, the method of the present disclosure does not require a credit delegation system such as a certificate provisioning service (CPS), a contract certificate pool (CCP), and a directory service.

In addition, the method of the present disclosure may can support vehicle sharing services which contribute to user conveniences, user privacy, and contract flexibility and providing various business opportunities.

DETAILED DESCRIPTION

Figure 1:
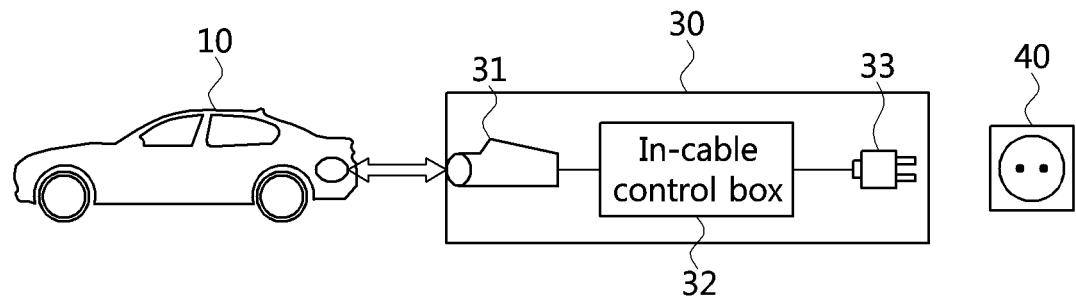
FIG. 1 is a conceptual diagram illustrating an EV conductive charging system to which an exemplary embodiment of the present disclosure may be applied.

For a more clear understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure.

When a component is referred to as being "connected" or "coupled" to another component, the component may be directly connected or coupled logically or physically to the other component or indirectly through an object therebetween. In contrast, when a component is referred to as being "directly connected" or "directly coupled" to another component, it is to be understood that there is no intervening object between the components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in Vehicle (PV)": An electric vehicle rechargeable through wireless charging from an electric vehicle supply equipment (EVSE) without using a physical plug or a physical socket.

"Heavy duty vehicle (H.D. Vehicle)": Any four- or more wheeled vehicle defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads, and highways and rated at less than 4,545 kg gross vehicle weight.

"Wireless power charging system (WCS)": A system for wireless power transfer and control of interactions including operations for an alignment and communications between a ground assembly (GA) and a vehicle assembly (VA).

"Wireless power transfer (WPT)": A transfer of electric power between a power source such as a utility, the power grid, an energy storage device, a fuel cell generator and the EV through a contactless channel such as electromagnetic induction and resonance.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly capable of transferring power. The automatic charging may be performed after obtaining necessary authentication and access.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": A transformer formed by the coil in a ground assembly (GA) coil and the coil in a vehicle assembly (VA) coil that allows power to be transferred with galvanic isolation.

"Inductive coupling": A magnetic coupling between two coils. One of the two coils may refer to the ground assembly (GA) coil, and the other one of the two coils may refer to the vehicle assembly (VA) coil.

"Ground assembly (GA)": An assembly on the ground or infrastructure side including the GA coil, a power/frequency conversion unit, and GA controller as well as the wiring from the grid and between each unit, filtering circuits, housing(s) etc., necessary to function as the power source of wireless power charging system. The GA may include components suitable for controlling impedances and resonant frequencies including ferrites and electromagnetic shielding materials for enhancing magnetic flus paths.

"Vehicle assembly (VA)": An assembly within the vehicle including the VA coil, rectifier/power conversion unit and VA controller as well as the wiring to the vehicle batteries and between each unit, filtering circuits, housing(s), etc., necessary to function as the vehicle part of a wireless power charging system. The VA may include components suitable for controlling impedances and resonant frequencies including ferrites and electromagnetic shielding materials for enhancing magnetic flus paths.

The GA may be referred to as a supply device, a primary device, and so on, and the VA may be referred to as an EV device, a secondary device, and so on.

"Primary device": An apparatus which provides a contactless coupling to the secondary device. In other words, the primary device may be an apparatus extraneous to an EV. When the EV is receiving power, the primary device may act as a source of the transferred power. The primary device may include the housing and all covers.

"Secondary device": An apparatus mounted within the EV which provides the contactless coupling to the primary device. In other words, the secondary device may be installed within the EV. When the EV is receiving power, the secondary device may transfer the power from the primary to the EV. The secondary device may include the housing and all covers.

"GA controller": A portion of the GA which regulates the output power level to the GA coil based on information from the vehicle.

"VA controller": A portion of the VA which monitors certain in-vehicle parameters during charging and initiates communication with the GA to adjust an output power level.

The GA controller may be referred to as a primary device communication controller (PDCC), and the VA controller may be referred to as an electric vehicle communication controller (EVCC).

"Magnetic gap": A vertical distance between the plane of the higher of the top of the litz wire or the top of the magnetic material in the GA coil to the plane of the lower of the bottom of the litz wire or the magnetic material in the VA coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom of the litz wire or the magnetic material in the VA Coil mounted within a vehicle to the ground surface.

"VA Coil magnetic surface distance": A distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions may output a harmful electric shock.

"Live component": Any conductor or conductive component intended to be electrically energized in normal use.

"Direct contact": A contact of persons with live components. (See IEC 61440)

"Indirect contact": A contact of persons with exposed, conductive, and energized components made live by an insulation failure. (See IEC 61140)

"Alignment": A process of detecting a relative position of primary device to secondary device and/or detecting the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishing a relationship between two peer communication entities.

"High level communication (HLC)": A particular type of digital communication. The HLC is necessary for additional services which are not covered by command & control communication. The data link of the HLC may use a power line communication (PLC), but it is not limited.

"Low power excitation (LPE)": A technique of activating the primary device for the fine positioning and pairing to allow the EV to detect the primary device, and vice versa.

"Service set identifier (SSID)": A unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, it may not provide any security features to the network.

"Extended service set identifier (ESSID)": A name of a network to which one desires to connect. It is similar to SSID but may be a more extended concept.

"Basic service set identifier (BSSID)": The BSSID typically consists of 48 bits and is used to distinguish a specific BSS. In the case of an infrastructure BSS network, the BSSID may be a medium access control (MAC) of the AP equipment. For an independent BSS or ad hoc network, the BSSID may be generated with any value.

A charging station may include at least one GA and at least one GA controller configured to manage the at least one GA. The GA may include at least one wireless communication device. The charging station may refer to a location having at least one GA, which is installed in home, office, public place, road, parking area, etc.

Hereinbelow, exemplary embodiments of the present disclosure will be described in detail with reference to the accompanying drawings.

FIG. 1 is a conceptual diagram illustrating an EV conductive charging system to which an exemplary embodiment of the present disclosure may be applied.

As shown in FIG. 1, the EV conductive charging may be performed based on an interworking of an EV charging cable 30, an EV 10, and a power outlet 40 installed in an existing building or charging stand.

The EV 10 may be generally defined as an automobile that supplies an electric current from a rechargeable energy storage device such as a battery mounted on the EV 10 as an energy source of an electric motor.

The EV 10 may be a hybrid electric vehicle (HEV) having an electric motor as well as an internal combustion engine. Also, the EV 10 may be not only an automobile but also a motorcycle, a cart, a scooter, or an electric bicycle.

Further, the EV 10 according to the present disclosure may include an inlet for the conductive charging of its battery. Here, the EV 10 of which battery may be conductively charged may be referred to as a plug-in electric vehicle (PEV) as defined above.

The inlet provided in the EV 10 according to the present disclosure may support a slow charging or a rapid charging. Here, the EV 10 may include either a single inlet that supports both of the slow charging and the rapid charging through a single plug connection, or inlets that respectively support the slow charging and the rapid charging.

In addition, the EV 10 according to the present disclosure may further include an on-board charger (OBC) to support the slow charging by an alternating current (AC) power supplied from a general power system. The OBC may boost a level of the AC power supplied from the general power system and convert into a direct current (DC) power to supply the DC power to the battery of the EV 10 during the course of the slow charging. Accordingly, in case the AC power for the slow charging is supplied to the inlet of the EV 10, the slow charging may be performed through the OBC. In contrast, in case the DC power for the rapid charging is supplied to the inlet of the EV 10, the rapid charging may be performed without an intervention of the OBC.

The EV charging cable 30 may include at least one of a charging plug 31 connected to the inlet of the EV 10, an outlet plug 33 connected to the outlet 40, or an in-cable control box (ICCB) 32.

The charging plug 11 may be a connection part that can be electrically connected to the inlet of the EV 10. The ICCB 12 may communicate with the EV 10 to receive status information of the EV or to control the electric power charging of the EV 10.

Although the ICCB 12 is illustrated as being included in the EV charging cable 10, the ICCB 12 may be mounted in a place other than the EV charging cable 10 or may be combined with an SECC described below or replaced by the SECC.

The outlet plug 13, which is suitable for being connected to the outlet of the charging stand to receive the power, may be an electrical connection member such as a general plug or a cord set.

The electric power outlet 30 may refer to an outlet installed at various places such as a parking lot attached to a house of an owner of the EV 10, a parking area for charging an EV at a gas station, or a parking area at a shopping center or an office building, for example.

In addition, a device referred to as a supply equipment communications controller (SECC) may be installed in a building or place (e.g., a charging stand) where the outlet 30 is installed to control a charging procedure by communicating with one of the components of the ICCB 12 or the EV 10 (e.g., electric vehicle communications controller (EVCC)).

The SECC may communicate with a power grid, an infrastructure management system that manages the power grid, a management server (hereinbelow, referred to as 'server') of the building in which the outlet 30 is installed, or an infrastructure server through wired or wireless communications.

The power outlet 40 may supply the AC power of the power system as it is. For example, the power outlet 40 may supply the AC power corresponding to at least one of single-phase two-wire (1P2 W) system or a three-phase four-wire (3P4 W) system.

The EV charging cable 30 may support the slow charging and supply the electric power for the slow charging to the EV 10. The electric power supplied to the EV 10 for the slow charging may be in a range of 3.3 to 7.7 kWh.

The EV charging cable 30 may support the rapid charging and supply the electric power for the rapid charging to the EV 10. The electric power supplied to the EV 10 for the rapid charging may be in a range of 50 to 100 kWh.

Figure 2:
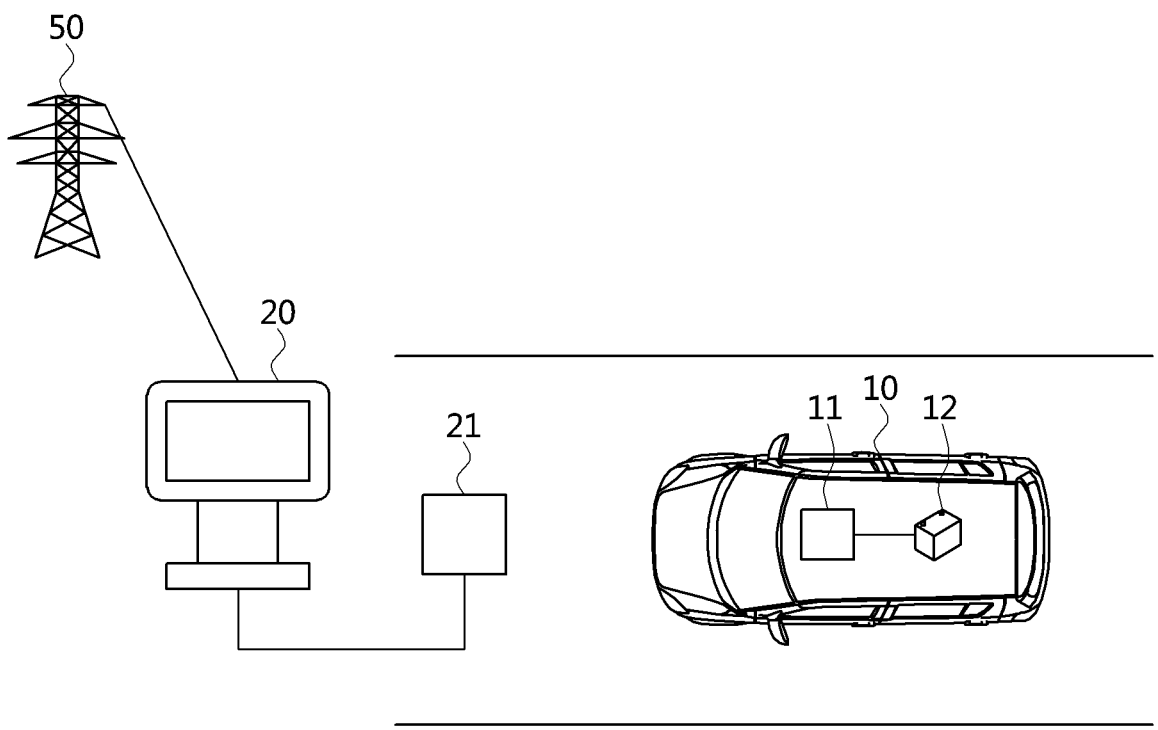
FIG. 2 is a conceptual diagram illustrating a wireless power transfer (WPT) system to which an exemplary embodiment of the present disclosure may be applied.

FIG. 2 is a conceptual diagram illustrating a concept of a wireless power transfer (WPT) to which an exemplary embodiment of the present disclosure may be applied.

As shown in FIG. 2, a WPT may be performed by at least one component of an electric vehicle (EV) 10 and a charging station 20 and may be used for transferring power to the EV 10 without any wire.

Particularly, the EV 10 may be usually defined as a vehicle that supplies an electric power stored in the rechargeable energy storage including a battery 12 to an electric motor in a power train system of the EV 10.

The EV 10 according to an exemplary embodiment of the present disclosure may include a hybrid electric vehicle (HEV) having an electric motor as well as an internal combustion engine, and may include not only an automobile but also a motorcycle, a cart, a scooter, and an electric bicycle.

The EV 10 may include a power reception pad 11 that has a reception coil suitable for receiving the electric power for charging the battery 12 wirelessly or and may include a plug receptacle suitable for receiving the electric power for conductively charging the battery 12. In particular, the EV 10 configured for conductively charging the battery 12 may be referred to as a plug-in electric vehicle (PEV).

The charging station 20 may be connected to the power grid 50 or a power backbone, and may provide the AC power to a power transmission pad 21 having a transmission coil via a power link.

The charging station 20 may communicate with the power grid 50, or the infrastructure management system or an infrastructure server that manages the power grid, and may be configured to perform wireless communications with the EV 10.

The wireless communications may be performed through Bluetooth, Zigbee, cellular, wireless local area network (WLAN), or the like.

Additionally, the charging station 20 may be located at various places including a parking area attached to the owner's house of the EV 10, a parking area for charging an EV at a gas station or the like, a parking area at a shopping center or a workplace, but is not limited thereto.

The wireless power transfer to the battery 12 of the EV 10 may be performed as follows. First, the power reception pad 11 of the EV 10 is disposed in an energy field generated by the power transmission pad 21. Then the reception coil in the power reception pad 21 and the transmission coil in the power transmission pad 11 are coupled to and interacts each other. An electromotive force may be induced in the power reception pad 11 as a result of the coupling or the interaction, and the battery 12 may be charged by the induced electromotive force.

The charging station 20 and the power transmission pad 21 as a whole or in part may be referred to as the ground assembly (GA), of which meaning and function were defined above.

Also, all or part of the power reception pad 11 and other internal components of the EV 10 may be referred to as the vehicle assembly (VA), of which meaning and function were defined above.

The power transmission pad or the power reception pad may be configured to be non-polarized or polarized.

In case the pad is non-polarized, there is one pole in a center of the pad and an opposite pole around an external periphery of the pad. The magnetic flux may be formed to exit from the center of the pad and return to external boundaries of the pad.

In case the pad is polarized, the pad may have respective poles at opposite end portions of the pad. The magnetic flux may be formed based according to an orientation of the pad.

Figure 3:
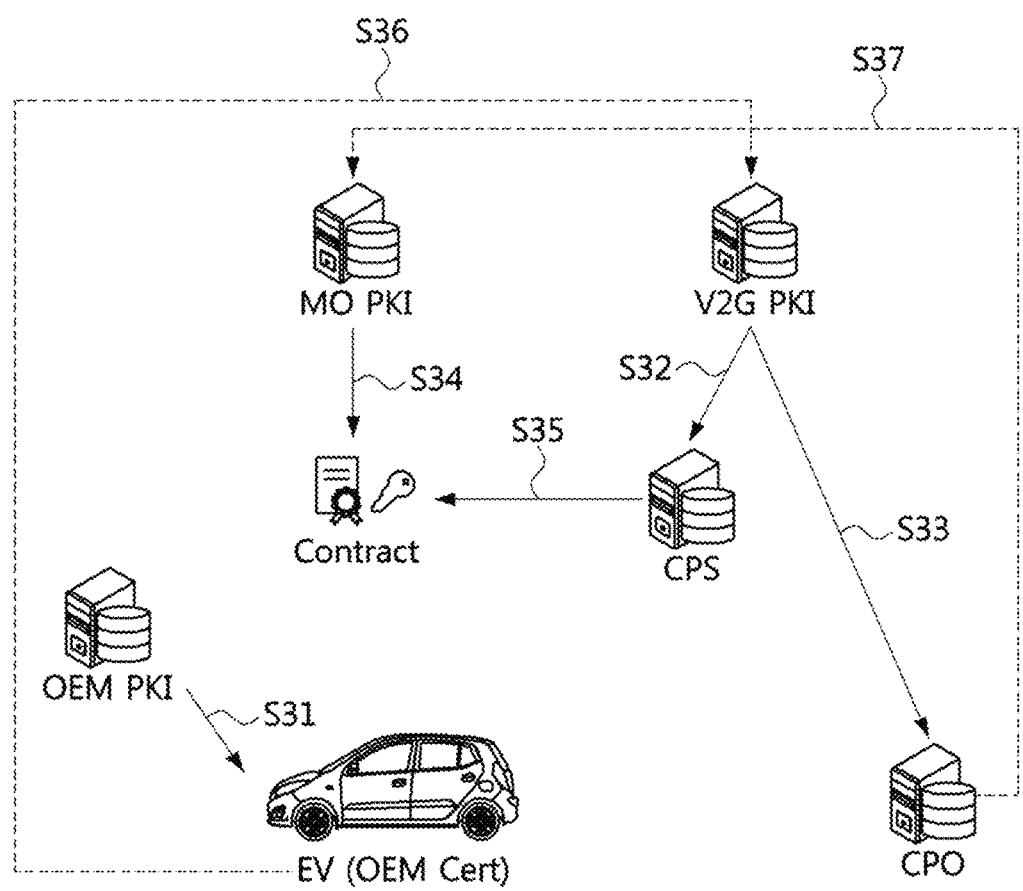
FIG. 3 shows a general procedure for establishing a trust relationship used for an electric vehicle power transfer service.

FIG. 3 shows a general procedure for establishing a trust relationship used for an electric vehicle power transfer service.

The procedure for establishing the trust relationship shown in FIG. 3 conforms to an ISO 15118 standard, which is an international standard for communications between an electric vehicle (EV) and an electric vehicle supply equipment (EVSE). This standard defines communication technologies and application protocols that enable many of the functions required for eMobility services. Those features include scheduled charging, safety checks, billing, progress control, discharging, wireless power transfer, and other value-added services. In particular, the latest version of the ISO 15118 standard defines user authentication as well as security requirements for communication protection and end-to-end securities.

Plug-and-charge (PnC) is one of main features defined in the ISO 15118 standard for the user authentication and is a contract-based authentication mechanism. When an EV user 'plugs' a charging cable into the EVSE and leaves the EV, the PnC system may automatically authenticate the EV user and start the charging. In the case of a wireless charging, the user may simply park and leave the EV and the rest of the charging process may be handled automatically between the EV and the EVSE.

The PnC mechanism relies on security technologies such as public key cryptography, digital certificates, and a public key infrastructure (PKI).

According to the trust relationship according to the ISO 15118 standard shown in FIG. 3, an original equipment manufacturer (OEM) which manufactures the EV may issue an OEM certificate (OEM cert) to the EV (S31). A vehicle-to-grid (V2G) PKI issues a certificate provisioning service (CPS) certificate and a charge point operator (CPO) certificate (S32, S33). A mobility operator (MO) PKI issues a contract certificate based on contract data (S34), and the certificate provisioning service (CPS) may facilitate an installation of the contract certificate issued based on contract data (S35). As a result, the EV trusts the V2G root certification authority (CA) (S36), and the CPO trusts the MO root CA (S37).

A typical PnC procedure will now be described with reference to FIG. 3.

First, the EV user may conclude a contract with the mobility operator (MO) which is also referred to as an "eMobility service provider" for a charging service for a specific EV to which the user has a right to use. The contract may be associated with an eMobility account identifier (eMAID). The mobility operator (MO) may issue the eMAID as an account credential and may generate the contract certificate bound to the eMAID and a corresponding private key.

In a second stage of the PnC, the contract certificate and the private key are installed in the EV. The installation of the certificate requires interactions of many entities and is complex and expensive. In detail, the EV manufacturer (OEM) issues an OEM provisioning certificate to install in the EV, and an V2G operator performs a trust delegation. The CPO, which manages and operates the charging infrastructure, may help the MO to securely deliver the contract certificate and keys to the EV that are likely to have no manner for communicating other than the EVSE.

An end-to-end security between the EV and the MO may require complex hardcore encryption technologies such as a unilaterally ephemeral Diffie-Hellman key exchange protocol, the certificate provisioning service for the trust delegation between the EV and the MO, and a real-time certificate validation service referred to as an 'online certificate status protocol (OCSP)' for a secure and economical delivery of sensitive information.

The contract certificate and the private key are installed in the EV to be used for authentication and authentication of the EV user in each charging session. During the authentication stage, the EV signs a message with the private key to prove an ownership of the contract certificate and uses the certificate to indicate the eMAID to which the bills for the session is to be directed. Meanwhile, in the authentication stage, a backend system of the CPO may check the revocation status of the contract certificate, and the corresponding to the contract certificate, and a validity of the account.

The current PnC mechanism defined in the ISO 15118 standard and summarized above has some limitations as follows.

First, the installation of the contract certificates and the private key is very complex. Also, there are so many actors such as the certificate provisioning service (CPS), a contract certificate pool (CCP), and a directory service, which make the implementation and testing of the system more difficult due to the delegation of trust and increase a complexity of the system structure.

Second, the configuration that require the installation of personal and sensitive information inside the EV may lead to security risks and a privacy infringement. Depending on the regions or countries, such an architecture may violate local regulations related with personal data such as GDPR.

Third, since each of the MOs has to set up and operate its own PKI to issue the contract certificate, the MOs have to bear a lot of financial burden and operational costs.

Finally, the inheritance nature of the PnC architecture makes it impossible to support a car sharing service which requires that people can use the same contract for a plurality of EVs and one EV can support multiple contracts. In other words, use cases including EV rental services, sharing of an EV by a plurality of drivers, ownership changes, EV termination, and so on require the contract to be separated from the EV.

The typical PnC mechanism using the contract certificate has three issues related to the authentication: (1) how the EV will trust the CPO/SECC, (2) how the EV will trust the contract data, and (3) how the CPO will trust the contract.

In the typical PnC mechanism, the first trust issue is solved because the EV trusts the V2G root CA and the V2G root CA issues a certificate to the CPO. In addition, the second trust issue is solved because the EV trusts the V2G root CA, the V2G root CA issues a certificate to the CPS, and the CPS signs a contract package. Finally, the third trust issue is solved because the CPO trusts the MO, and the MO issues a contract certificate so that the CPO can trust the contract.

The present disclosure provides a modified PnC mechanism which may be referred to as 'EVPnC' to overcome the limitations of the conventional PnC mechanism. The PnC mechanism according to the present disclosure removes the contract certificate from the system and simplify the architecture to enhance a flexibility and cost-effectiveness of the EV user authentication process.

The EVPnC scheme provided by the present disclosure, which uses a similar technology as the conventional PnC scheme but has a simplified architecture to overcome the limitations of the conventional PnC scheme, has following characteristics to overcome the limitations of PnC.

First, the contract certificate is not issued to the user.

Second, the authentication of the EV user is performed using the EV's own certificate.

Third, an association of the EV with a certain contract is done in a backend system.

Fourth, several methods may be used for a backend mechanism that maps the EV to a corresponding contract to improve a scalability, efficiency and flexibility.

More specifically, the EVPnC according to the present disclosure may operate as follows.

The EVPnC according to the present disclosure may be initiated with the same prerequisites as the conventional PnC.

The OEM PKI issues an EV certificate for each EV during a manufacturing process of the EV and securely stores the certificate and a private key in the EV. The EVPnC may call the EV certificate instead of OEM provisioning certificate used for other purposes. Also, the CPO PKI may issue its own certificate for the EVSE similarly to the conventional PnC.

One of major differences between the EVPnC with the conventional PnC is that the EVPnC requires a backend mechanism to maintain information about which contract account such as the eMobility account identifier (eMAID) is linked to each EV.

The backend mechanism for performing the function may include a directory service, a clearing house service, and so on. According to an exemplary embodiment, the clearing house service (CHS) as used as the backend mechanism.

The CHS is required to be a reliable service and to be certified by the V2G root CA similarly to the CPS in the conventional PnC system. However, the type or actual implementation technology used for the CHS is not limited thereto. The CHS may be implemented by a cloud service, for example, that may be accessed by all MOs and CPOs. Alternatively, there may be multiple CHS services and multiple different MOs and CPOs for business reasons.

In an exemplary embodiment of the present disclosure, it is assumed that the V2G operator operates the CHS cloud service.

Figure 4:
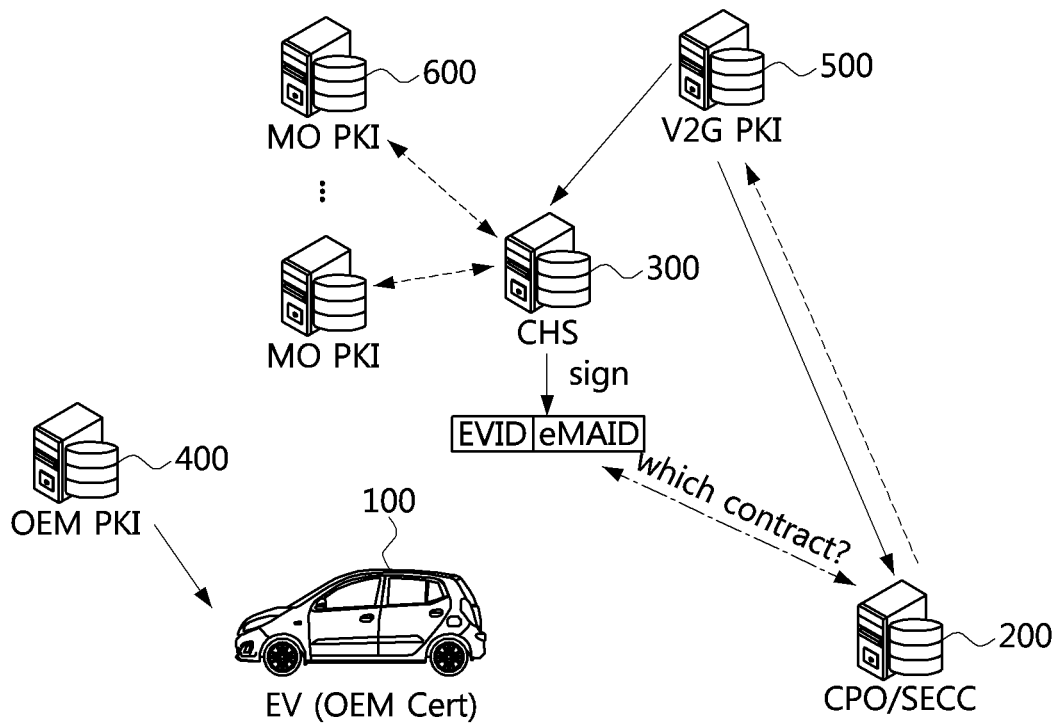
FIG. 4 is a conceptual diagram of an EV user authorization system using a clearing house service according to an exemplary embodiment of the present disclosure.

FIG. 4 is a conceptual diagram of an EV user authorization system using the clearing house service according to an exemplary embodiment of the present disclosure.

The EV user authorization system according to an exemplary embodiment of the present disclosure, which may be referred to as the 'EVPnC', and FIG. 4 shows an example of the EV user authorization system using the clearing house service.

As shown in FIG. 4, the EV user authorization system according to an exemplary embodiment of the present disclosure may include a charge point operator (CPO) 200, a clearing house service (CHS) device 300, an OEM PKI 400, a V2G PKI 500, and a MO PKI 600.

The MO 600 may check a request of the EV user, associate the EV to a charging service account, and monitors changes in the EV and the account. The MO 600 may notify the CHS of information on the contractual relationship between the EV user, an expiration date of the contract, and any change in the contract.

The CHS 300 may securely receive the association on information including an electric vehicle identifier (EVID) which is a unique identifier for an EV and the eMAID from the MO 600 and store such information. The CHS 300 may provide the association information such as the EVID and the eMAID and the expiration date information to the CPO according to a request from the CPO.

The CPO 200 authenticates the EV by verifying the EV's ownership of the EV certificate bound to the EVID. The CPO also authenticates the EV for charging by querying the CHS for the expiration date bound to the EVID.

The OEM PKI 400 may allocate a unique EVID to each EV and issue an EV certificate containing the EVID and a corresponding private key. The EV may securely store the EV certificate issued by the OEM PKI system.

In addition, the V2G PKI 500 may issue a CPS certificate and a CPO certificate.

Referring to FIG. 4, an EV user may associate his or her eMAID with a specific EV 100 expressed by the EVID when registering the EV with the MO. The EVID may be included in the EV certificate. The MO 600 submits the information on the relationship between the eMobility account and the EV to the CHS in a form of (EVID, eMAID, expiration date), for example. Upon receiving the association information, the CHS may store the association information and a validity period in a storage. When the EV arrives at the charging station and request to start a charging session, the EV may use the EV certificate and the private key to authenticate itself to the charging station.

After authenticating the EV 100, the CPO 200 or the SECC may contact the CHS 300 to verify the eMAID and the validity period of the EV. A positive response from the CHS 300 to the EV may confirm that the charging service provided to the EV may be billed to the account indicated by the eMAID associated with the contract and responded by CHS. The eMAID may represent a valid account which may be used effectively for the charging service until the relationship expires. After the authorization for the EV user is completed, the charging session may continue.

Whenever the contract account related to the charging service changes, the MO 600 may notify the change to the CHS 300 by updating the EVID associated with the account, changing the validity period, or removing the relationship record of the eMAID related to a terminated or suspended session. Before associating the EVID to the eMAID, the MO 600 must verify that the requested was made by an authorized person by verifying that the EV user owns both the account and the EV or the actual owner of the EV has authorized the process. The MO 600 may set an appropriate expiration time for the relationship.

Figure 5:
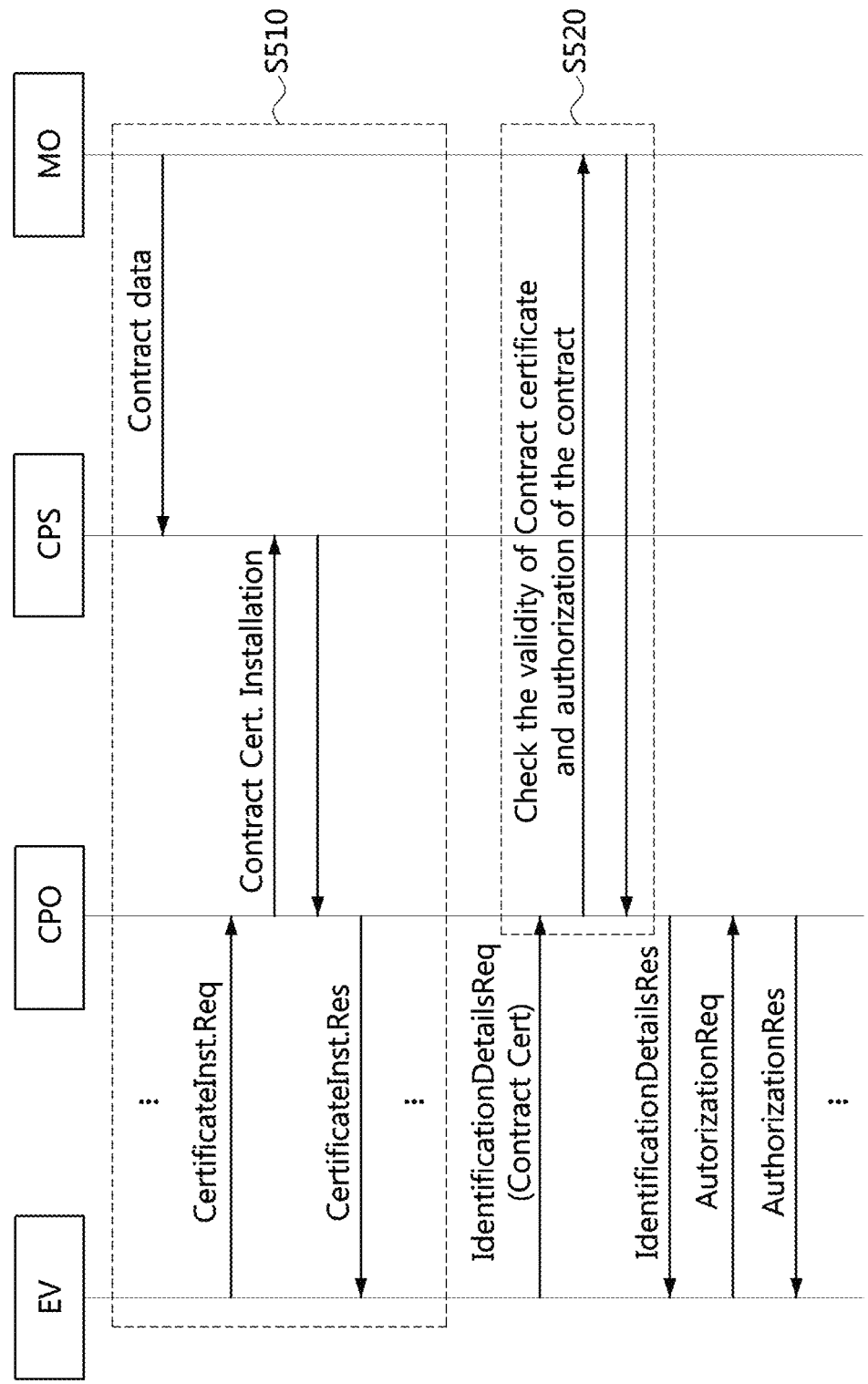
FIG. 5 is a sequence diagram showing an EV user authorization method using a general PnC scheme.

FIG. 5 is a sequence diagram showing an EV user authorization method using a general PnC.

As shown in FIG. 5, the conventional PnC based on the contract certificate includes operations of installing the contract certificate in the EV (S510), and operations of validating the contract certificate and authorizing he contract (S520).

Figure 6:
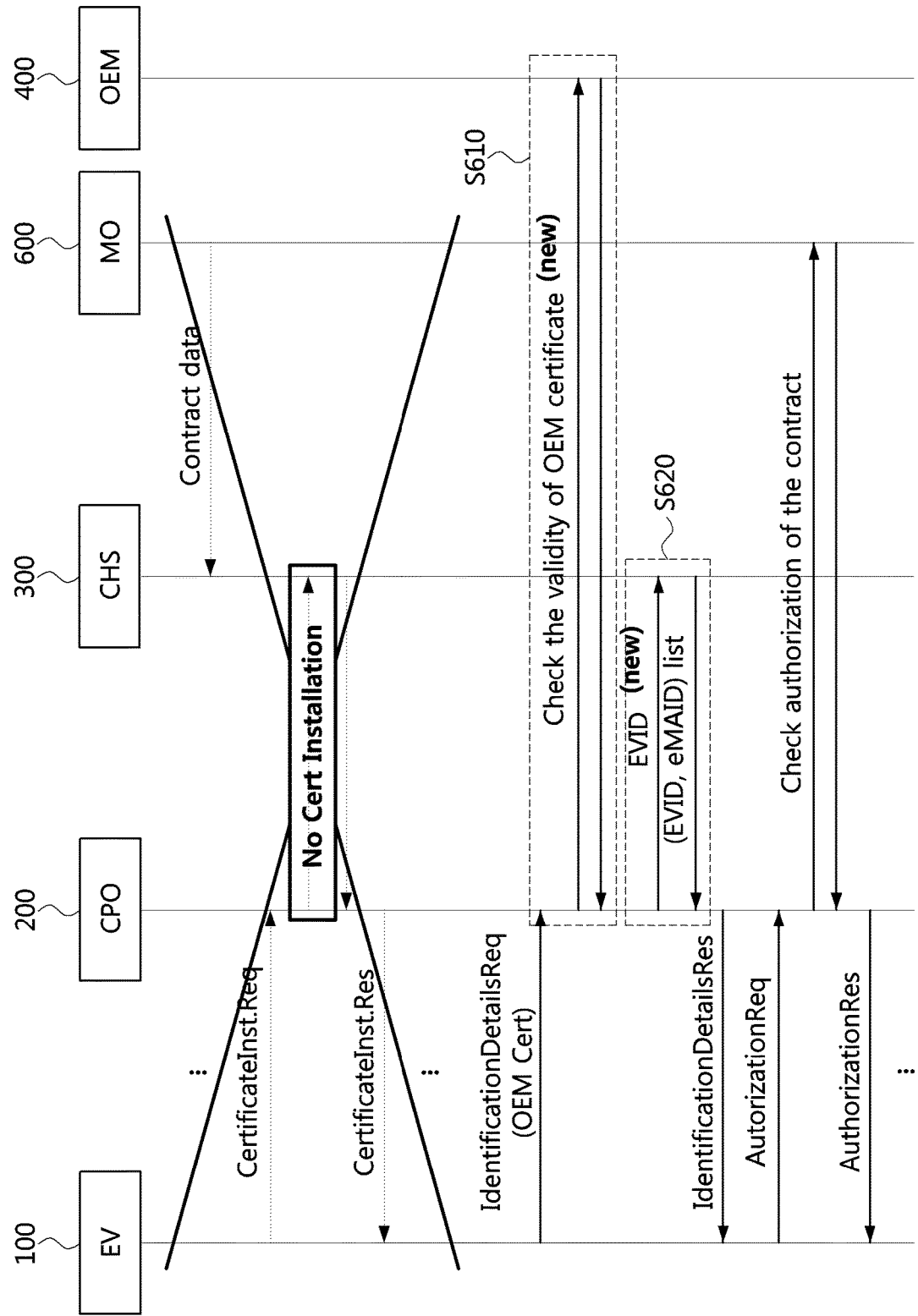
FIG. 6 a sequence diagram showing an EV user authorization method using an EVPnC scheme according to an exemplary embodiment of the present disclosure.

FIG. 6 a sequence diagram showing an EV user authorization method using the EVPnC scheme according to an exemplary embodiment of the present disclosure.

Compared with the conventional method shown in FIG. 5, the EV user authorization method according to an exemplary embodiment shown in FIG. 6 does not include the operation of installing the contract certificate in the EV.

In addition, the CHS 300 acts a leading actor for implementing the EV user authorization method shown in the embodiment of FIG. 6. Accordingly, the EV user authorization method according to the present embodiment shown in FIG. 6 may include an operation of checking the validity of the OEM certificate (i.e., a user certificate) (S610) and an operation of acquiring, by the CPO 200, the association information between the EV and the contract from the CHS 300 instead of the operations of checking the validity of the contract certificate and authorizing the contract by using the contract certificate (S620).

Figure 7:
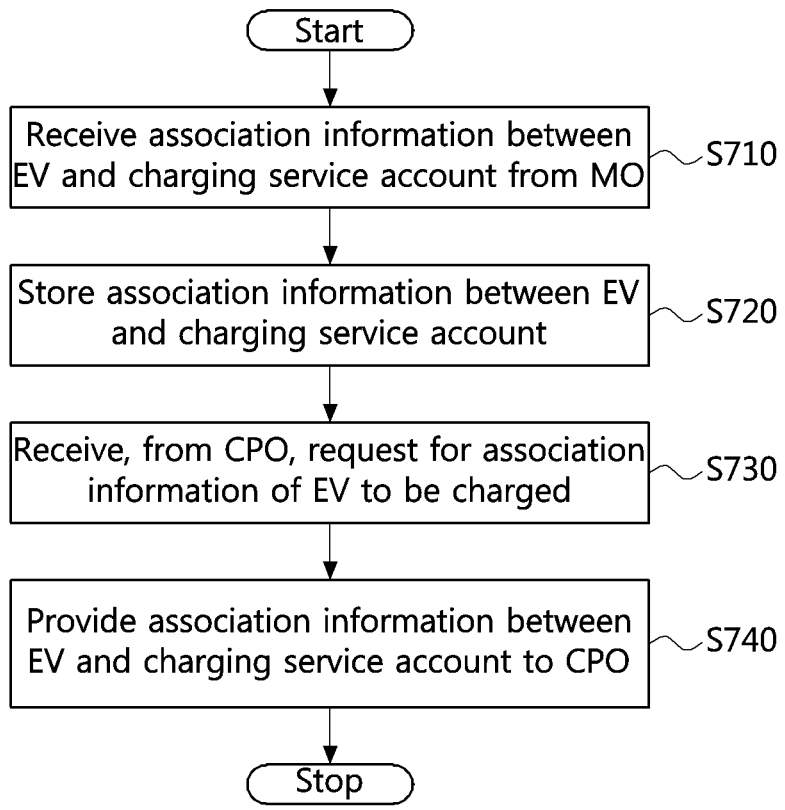
FIG. 7 is a flowchart showing an EV user authorization method for an EV charging according to an exemplary embodiment of the present disclosure.

FIG. 7 is a flowchart showing an EV user authorization method for the EV charging according to an exemplary embodiment of the present disclosure.

The EV user authorization method shown in FIG. 7 may be performed by an EV user authorization intermediary device, for example, the clearing house service (CHS) device described above.

The EV user authorization intermediary device may be interfaced with the mobility operator (MO) and the charge point operator (CPO) to perform the EV user authorization method according to the present disclosure.

Referring to FIG. 7, the EV user authorization intermediary device may receive the association information between the EV and the charging service account from the MO having a contract with the EV user to provide the charging service to the EV (S710). The EV user authorization intermediary device may safely store the association information in its own storage or a separate storage connected to the device (S720).

Afterwards, the EV user authorization intermediary device may receive a request for the association information of an EV to be charged from the CPO related to the charging station where the EV is to be charged (S730). The EV user authorization intermediary device may provide the association information between the EV to be charged and the charging service account to the CPO (S740).

Figure 8:
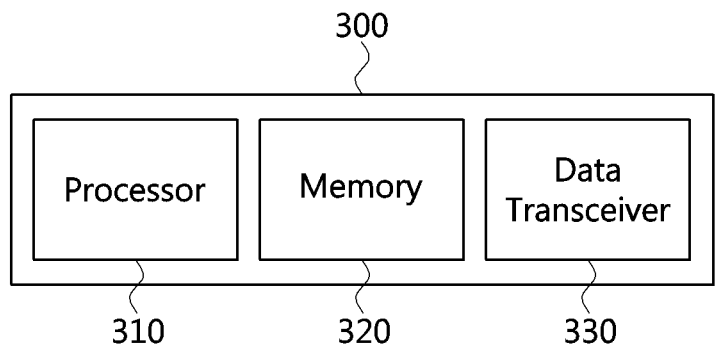
FIG. 8 is a block diagram of a clearing house service device intermediating the EV user authorization according to an exemplary embodiment of the present disclosure.

FIG. 8 is a block diagram of a clearing house service device intermediating the EV user authorization according to an exemplary embodiment of the present disclosure.

The clearing house service (CHS) device 300, which intermediaries the EV user authorization for the EV charging, may be interfaced with the MO having the contractual relationship with the EV user and the CPO supplying the electric power to the EV requesting the charging service The CHS device 300 may include at least one processor 310, a memory 320 for storing at least one program instruction to be executed by the processor 310, and a data transceiver 330 configure to perform communications through a network.

The processor 310 may execute program instructions stored in the memory 320. The processor 310 may include a central processing unit (CPU) or a graphics processing unit (GPU), or may be implemented by another kind of dedicated processor suitable for performing the methods of the present disclosure. The memory 320 may include, for example, a volatile memory such as a read only memory (ROM) and a nonvolatile memory such as a random access memory (RAM).

The at least one instruction may include instructions configured to receive association information between the EV and a charging service account from the MO, instructions configured to store the association information between the EV and the charging service account, instructions configured to receive a request for an association information of an EV to be charged from the CPO, and instructions configured to provide the association information between the EV to be charged and the charging service account to the CPO.

The CHS device 300 may also be interfaced with a mobility operator MO), a charge point operator (CPO), and a V2G root CA through the data transceiver 330.

The at least one instruction may include instructions configured to receive a notification of occurrence of a change in the charging service account from the MO, and instructions configured to update the charging service account in which the change occurred.

The EV user authorization intermediary device may be authenticated by the V2G root CA.

The EV may request an authorization from the CPO using an EV certificate and a corresponding private key.

The EV certificate may be issued by the OEM of the EV and include a unique identifier of the EV and the corresponding private key.

According to another exemplary embodiment of the present disclosure, the EV may support both the general contract-based PnC and EV-based PnC. In such a case, the contract certificate, the EV certificate, or the OEM provisioning certificate may be used as an identification certificate. The identification certificate is a certificate used by the EVCC to authenticate itself to the SECC according to the contract-based PC or EV-based PnC authentication scheme. Here, the EV certificate is a certificate issued to the EVCC for the identification in the EV-based plug-and-charge (PnC) scheme.

To implement the EVPnC in a system implementing the contract-based PnC scheme, the EVPnC may be selected for an identification service, and the OEM provisioning certificate or the EV certificate may be used for the authentication request and response. In addition, the certificate may be used to sign metering receipts, and V2G root certificate may be used for authorizing the bills.

The EV user authorization mechanism according to the present disclosure has following advantages:

Preventing privacy violations and general data protection regulation (GDPR) violations.

Making the MO PKI system unnecessary.

Does not requiring a credit delegation system such as the CPS, the CCP, and a directory service.

Facilitating vehicle sharing services which contribute to user conveniences, user privacy, and contract flexibility and providing various business opportunities.

The apparatus and method according to exemplary embodiments of the present disclosure may be implemented by computer-readable program codes or instructions stored on a non-transitory computer-readable recording medium. The non-transitory computer-readable recording medium includes all types of recording media storing data readable by a non-transitory computer system. The computer-readable recording medium may be distributed over computer systems connected through a network so that a computer-readable program or code may be stored and executed in a distributed manner.

The non-transitory computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some aspects of the present disclosure have been described above in the context of a device but may be described using a method corresponding thereto. In particular, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some exemplary embodiments, at least one of most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods of the present disclosure are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

The invention claimed is:

1. A method of intermediating an electric vehicle (EV) user authorization for charging an EV performed by an EV user authorization intermediary device in association with a mobility operator (MO) having a contract with an EV user and authorizing the EV user to provide a charging service to the EV and a charge point operator (CPO) supplying electric power to the EV, the EV user authorization method comprising:

receiving association information including an EV identifier of the EV and charging service account information of the EV from the MO;

storing the association information including the EV identifier and the charging service account information;

after the CPO receives a certificate other than a contract certificate from an EV to be charged and performs a validity check procedure for the certificate, receiving from the CPO a request for the association information, including the EV identifier included in the certificate, of the EV to be charged; and providing the EV identifier of the EV to be charged and the charging service account information of the EV to be charged to the CPO to enable the CPO to request an authorization.

2. The method of claim 1, further comprising:

receiving a notification of occurrence of a change in the charging service account information from the MO; and updating the charging service account information in which the change occurred.

3. The method of claim 1, wherein the EV user authorization intermediary device is a clearing house service (CHS) device certified by a vehicle-to-grid (V2G) root certification authority (CA).

4. The method of claim 1, wherein the EV requests a user authorization from the CPO using an EV certificate and a corresponding private key.

5. The method of claim 4, wherein the EV certificate is issued by an original equipment manufacturer (OEM) of the EV and comprises a unique identifier of the EV and the corresponding private key.

6. The method of claim 1, wherein the association information comprises the EV identifier, an eMobility account identifier (eMAID) as the charging service account information and an expiration date.

7. An electric vehicle (EV) user authorization intermediary device for charging an EV in association with a mobility operator (MO) having a contract with an EV user and authorizing the EV user to provide a charging service to the EV and a charge point operator (CPO) supplying electric power to the EV, the EV user authorization intermediary device comprising:

a hardware processor; and a memory storing at least one instruction to be executed by the processor, wherein the at least one instruction, when executed by the processor, causes the processor to:

receive association information including an EV identifier of the EV and charging service account information of the EV from the MO;

store the association information including the EV identifier and the charging service account information;

after the CPO receives a certificate other than a contract certificate from an EV to be charged and performs a validity check procedure for the certificate, receive from the CPO a request for the association information, including the EV identifier included in the certificate, of the EV to be charged; and provide the EV identifier of the EV to be charged and the charging service account information of the EV to be charged to the CPO to enable the CPO to request an authorization.

8. The EV user authorization intermediary device of claim 7, wherein the at least one instruction further comprises an instruction, which when executed by the processor, causes the processor to:

receive a notification of occurrence of a change in the charging service account information from the MO; and update the charging service account information in which the change occurred.

9. The EV user authorization intermediary device of claim 7, wherein the EV user authorization intermediary device is a clearing house service (CHS) device certified by a vehicle-to-grid (V2G) root certification authority (CA).

10. The EV user authorization intermediary device of claim 7, wherein the EV requests a user authorization from the CPO using an EV certificate and a corresponding private key.

11. The EV user authorization intermediary device of claim 10, wherein the EV certificate is issued by an original equipment manufacturer (OEM) of the EV and comprises a unique identifier of the EV and the corresponding private key.

12. The EV user authorization intermediary device of claim 7, wherein the association information comprises the EV identifier, an eMobility account identifier (eMAID) as the charging service account information, and an expiration date.

13. An electric vehicle (EV) user authorization system for charging an EV, the EV user authorization system comprising:

a mobility operator (MO) configured to:

associate an EV identifier of the EV with charging service account information according to a request of an EV user to generate association information including the EV and the charging service account, notify the association information to a clearing house service (CHS) device, and receive an authorization request including the association information to perform an authorization of the EV user by using the association information;

the CHS device configured to receive and store the association information including the EV identifier and the charging service account information from the MO and provide the association information including the EV identifier and the charging service account information in response to a request; and a charging station operator (CPO) configured to:

receive a certificate other than a contract certificate from an EV to be charged, authenticate the EV to be charged by checking a validity of the certificate, request, from the CHS device, the association information of the EV to be charged by providing the EV identifier obtained from the certificate;

receive the association information of the EV to be charged from the CHS device, and request the authorization of the EV user from the MO by using the EV identifier of the EV to be charged and the charging service account information of the EV to be charged.

14. The EV user authorization system of claim 13, further comprising:

an original equipment manufacturer (OEM) server configured to allocate a unique identifier to the EV and issue an EV certificate including the unique identifier and a corresponding private key to the EV.

15. The EV user authorization system of claim 14, wherein the EV requests a user authorization from the CPO using the EV certificate and the corresponding private key.

16. The EV user authorization system of claim 13, wherein the CHS device is certified by a vehicle-to-grid (V2G) root certification authority (CA).

17. The EV user authorization system of claim 13, wherein the CHS device receives a notification of occurrence of a change in the charging service account information from the MO and updates the charging service account information in which the change occurred.

18. The EV user authorization system of claim 13, wherein the association information comprises the EV identifier, an eMobility account identifier (eMAID) as the charging service information, and an expiration date.

\* \* \* \* \*